(12) United States Patent
Taniguchi et al.

(10) Patent No.: US 9,272,587 B2
(45) Date of Patent: Mar. 1, 2016

(54) INTEGRATED PUNCTURE REPAIR KIT

(71) Applicant: SUMITOMO RUBBER INDUSTRIES, LTD., Kobe-shi, Hyogo (JP)

(72) Inventors: Norio Taniguchi, Kobe (JP); Tsutomu Kono, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/364,815

(22) PCT Filed: Nov. 22, 2012

(86) PCT No.: PCT/JP2012/080310
§ 371 (c)(1),
(2) Date: Jun. 12, 2014

(87) PCT Pub. No.: WO2013/103055
PCT Pub. Date: Jul. 11, 2013

(65) Prior Publication Data
US 2014/0366981 A1    Dec. 18, 2014

(30) Foreign Application Priority Data

Jan. 6, 2012    (JP) ................................ 2012-001443

(51) Int. Cl.
| B60C 25/00 | (2006.01) |
| B29C 73/16 | (2006.01) |
| B60S 5/04 | (2006.01) |
| B29L 30/00 | (2006.01) |

(52) U.S. Cl.
CPC ............... *B60C 25/16* (2013.01); *B29C 73/166* (2013.01); *B60S 5/04* (2013.01); *B29L 2030/00* (2013.01)

(58) Field of Classification Search
CPC .... B29C 73/166; B29C 73/02; B29C 73/025; B60C 29/062; B60S 5/04
USPC ................... 141/38, 104, 301–302; 137/223; 152/415
See application file for complete search history.

(56) References Cited

U.S. PATENT DOCUMENTS

2003/0056851 A1*    3/2003   Eriksen et al. ................... 141/38
2010/0101375 A1     4/2010   Yoshida et al.
(Continued)

FOREIGN PATENT DOCUMENTS

| DE | 10 2007 053 241 A1 | 5/2009 |
| EP | 2 123 432 A1 | 11/2009 |

(Continued)

OTHER PUBLICATIONS

International Search Report issued in PCT/JP2012/080310 dated Feb. 12, 2013.

(Continued)

*Primary Examiner* — Timothy L Maust
*Assistant Examiner* — Timothy P Kelly
(74) *Attorney, Agent, or Firm* — Birch, Stewart, Kolasch & Birch, LLP (57) ABSTRACT

An extraction cap of an integrated puncture repair kit is provided with: an intake unit for taking compressed air coming from a compressor into the extraction cap; an outlet unit for taking the intaken compressed air or both compressed air and a puncture repair solution to outside the extraction cap; a dedicated air flow path that ordinarily connects to the intake unit and provides conduction from the inlet unit to the outlet unit without passing through a bottle container; a dedicated puncture repair flow path comprising a first flow path section that is connected by a switching means to the intake unit instead of the dedicated air flow path and providing conduction from the intake unit into the bottle container, and a second flow path section providing conduction from inside the bottle container to the intake unit; a first on-off valve that is interposed in the second flow path section and ordinarily closes the first flow path section; and the switching means, which is actuated by downward pressing of a bottle unit and connects the intake unit switching from the dedicated air flow path to the dedicated puncture repair flow path, and also releases the first on-off valve to close the second flow path section.

14 Claims, 8 Drawing Sheets

(56) References Cited

U.S. PATENT DOCUMENTS

| | | | |
|---|---|---|---|
| 2011/0155280 A1* | 6/2011 | Eckhardt | 141/38 |
| 2012/0017727 A1* | 1/2012 | Lolli | 81/15.5 |
| 2014/0261878 A1* | 9/2014 | Jhou | 141/38 |
| 2015/0059921 A1* | 3/2015 | Jhou | 141/38 |

FOREIGN PATENT DOCUMENTS

| | | |
|---|---|---|
| EP | 2 338 671 A2 | 6/2011 |
| JP | 2005-199618 A | 7/2005 |
| JP | 2007-168418 A | 7/2007 |
| JP | 2008-155400 A | 7/2008 |
| JP | 2008-307861 A | 12/2008 |
| JP | 2010-001047 A | 1/2010 |
| JP | 2010-274450 A | 12/2010 |
| JP | 2 305 570 A1 | 4/2011 |

OTHER PUBLICATIONS

Search Report dated Jul. 24, 2015 for European Application No. 12864448.1.

* cited by examiner

INTEGRATED PUNCTURE REPAIR KIT

TECHNICAL FIELD

The present invention relates to an integrated puncture repair kit that is switchable between puncture repair and charging only compressed air so as to enhance versatility and improve operability.

BACKGROUND ART

As an integrated puncture repair kit that is switchable between puncture repair and charging only compressed air so as to enhance versatility, one described in the following patent document 1 is known. As conceptually shown in FIG. 8, the integrated puncture repair kit includes a compressor (b), a bottle unit (c), and a manual transfer switch (d) interposed between the compressor (b) and an extraction cap (c2), which are respectively disposed in a housing case (a). The bottle unit (c) includes a bottle container (c1) storing a puncture repair fluid therein, and the extraction cap (c2) attached to a mouth portion of the bottle container (c1).

Figure 8:
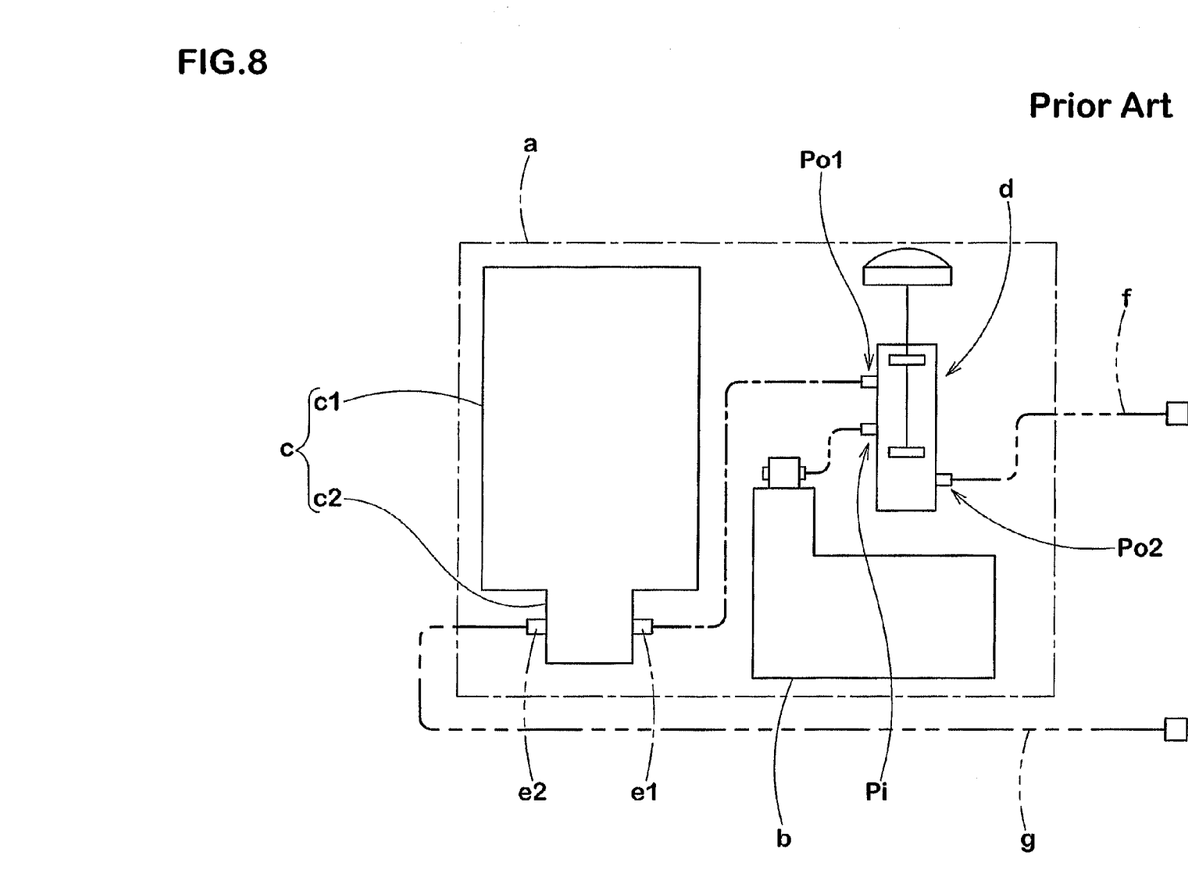
FIG. 8 is a conceptual view showing in a simplified manner a flow passage structure in a conventional puncture repair kit.

The extraction cap (c2) includes an inlet mouth portion (e1) to take in compressed air, and an outlet mouth portion (e2). Upon the compressed air from the inlet mouth portion (e1), the puncture repair fluid from the bottle container (c1) and the compressed air are sequentially discharged outside through the outlet mouth portion (e2).

The manual transfer switch (d) includes an inflow port (Pi) coupled to the compressor (b), and first and second outflow ports (Po1, Po2) to be selectively switched so as to communicate with the inflow port (Pi). The first outflow port (Po1) is coupled to the air inlet mouth portion (e1). A hose (f) dedicated to compressed air is coupled to the second outflow port (Po2). A hose (g) dedicated to puncture repair is coupled to the outlet mouth portion (e2).

The above puncture repair kit, however, includes the two hoses (f, g), and hence it is difficult to distinguish which one should be coupled to an object. Additionally, the transfer switch (d) is disposed separately, resulting in complicated internal piping. The complicated internal piping impairs assembly work efficiency and makes it difficult to achieve downsizing and cost reductions of the integrated puncture repair kit. The use of the two hoses (f, g) is also obstructive to the downsizing and cost reductions.

RELATED ART DOCUMENTS

Patent Documents

Patent document 1: Japanese unexamined Patent Application Publication No. 2010-274450.

DISCLOSURE OF THE INVENTION

Problems to be Solved by the Invention

It is an object of the present invention to provide an integrated puncture repair kit whose internal structure is simplified to enhance assembly work efficiency. The integrated puncture repair kit requires only one hose so as to improve operability and contribute to downsizing and cost reductions thereof.

Means of Solving the Problems

To solve the problems, in claim 1 according to the present invention, an integrated puncture repair kit comprises a compressor disposed in a housing case and configured to discharge compressed air, and a bottle unit disposed in the housing case and comprising an extraction cap attached to a mouth portion of a bottle container storing a puncture repair fluid. In the extraction cap comprises an inlet mouth portion, an outlet mouth portion, a flow passage dedicated to air, a flow passage dedicated to puncture repair, a first on-off valve, and switching means. The inlet mouth portion is configured to take the compressed air from the compressor into the extraction cap. The outlet mouth portion is configured to discharge the taken compressed air or both the compressed air and the puncture repair fluid to outside the extraction cap. The flow passage dedicated to air is configured to be coupled to the inlet mouth portion in a normal state defined as a state before operation of the switching means so as to allow the inlet mouth portion to communicate with the outlet mouth portion without passing through an interior of the bottle container. The flow passage dedicated to puncture repair comprises a first flow passage portion and a second flow passage portion, the first flow passage portion is configured to be coupled to the inlet mouth portion instead of the flow passage dedicated to air by the switching means so as to allow the inlet mouth portion to communicate with the interior of the bottle container, and the second flow passage portion is configured to allow the interior of the bottle container to communicate with the outlet mouth portion. The first on-off valve is interposed in the second flow passage portion and is configured to close the second flow passage portion in the normal state. The switching means is configured to be operated upon a push-down of the bottle unit so as to switch a coupling destination of the inlet mouth portion from the flow passage dedicated to air to the flow passage dedicated to puncture repair, and the switching means is configured to release the first on-off valve so as to open the second flow passage portion.

In claim 2 according to the present invention, the switching means comprises a switching retainer to retain a state of being switched to the flow passage dedicated to puncture repair.

In claim 3 according to the present invention, the extraction cap comprises a cap body and a mobile body. The cap body integrally comprises a barrel portion and a support portion, the barrel portion comprises a tubular portion whose upper end is attached to the mouth portion of the bottle container, and a bottom portion configured to close a lower end of the tubular portion, and the support portion extends upward from the bottom portion and coaxially with the tubular portion so as to reach the interior of the bottle container. The mobile body is externally inserted in and held by the support portion so as to be vertically movable relative to the support portion. The first on-off valve is disposed in the mobile body so as to be integrally movable with the mobile body. A relative upward movement of the mobile body causes a coupling destination switching from the flow passage dedicated to air to the flow passage dedicated to puncture repair, and causes release of the first on-off valve.

In claim 4 according to the present invention, an inner wall surface of the tubular portion comprises a large diameter wall portion having a large inner diameter, and a small diameter wall portion having a small inner diameter, and the small diameter wall portion is continuous with a lower side of the large diameter wall portion with a step portion interposed therebetween. The mobile body comprises a piston portion configured to be airtightly contacted with the small diameter wall portion, and a sheath pipe portion extending from the piston portion and coaxially with the piston portion. The piston portion comprises a circumferential groove shaped recessed portion to be defined on an outer peripheral surface of the piston portion, and a through hole portion disposed below the recessed portion and configured to permit communication between an outer peripheral surface side and an inner peripheral surface side of the piston portion. The flow passage dedicated to air is defined by the recessed portion. The first flow passage portion of the flow passage dedicated to puncture repair comprises the through hole portion, and a first clearance portion between the sheath pipe portion and the support portion. The second flow passage portion of the flow passage dedicated to puncture repair comprises the recessed portion, and a second clearance portion between the piston portion and the large diameter wall portion.

In claim 5 according to the present invention, the switching means comprises a projected piece projectedly extending downward from a lower end of the mobile body and passing through the bottom portion, and the mobile body is configured to cause a relative upward movement with respect to the cap body by the projected piece to be pushed up as the bottle unit is pushed down.

In claim 6 according to the present invention, the first on-off valve comprises an upper seal ring and a lower seal ring disposed on an outer peripheral surface of the piston portion and respectively located above and below the recessed portion. In the normal state, the upper seal ring and the lower seal ring are brought into close contact with the small diameter wall portion so as to close the second flow passage portion, and the relative upward movement of the mobile body allows the upper seal ring to oppose to the large diameter wall portion so as to open the second flow passage portion.

In claim 7 according to the present invention, an upper end of the support portion and an upper end of the sheath pipe portion are located above a fluid surface of the puncture repair fluid.

In claim 8 according to the present invention, a second on-off valve configured to close the first flow passage portion in the normal state is disposed at an upper end portion of the support portion, and the second on-off valve is configured to open the first flow passage portion upon the relative upward movement of the mobile body.

Effects of the Invention

According to the present invention described above, the extraction cap includes therein the flow passage dedicated to air that is to be coupled to the inlet mouth portion in the normal state, and the flow passage dedicated to puncture repair that is coupled to the inlet mouth portion instead of the flow passage dedicated to air by the switching means. The flow passage dedicated to air and the flow passage dedicated to puncture repair are switchable.

It is therefore ensured to simplify piping and structure in the integrated puncture repair kit so as to enhance assembly work efficiency. Additionally, only one hose needs to be coupled to an object, thus improving operability. The simplified piping and structure in the integrated puncture repair kit and the reduction in the number of hoses ensure to facilitate downsizing and cost reductions of the integrated puncture repair kit.

The first on-off valve interposed in the second flow passage portion of the flow passage dedicated to puncture repair is to close the second flow passage portion in the normal state. It is therefore possible to prevent the puncture repair fluid in the bottle container from being leaked outside during storage, or the like.

MODE FOR CARRYING OUT THE INVENTION

An embodiment of the present invention will be described in detail below.

Figure 1:
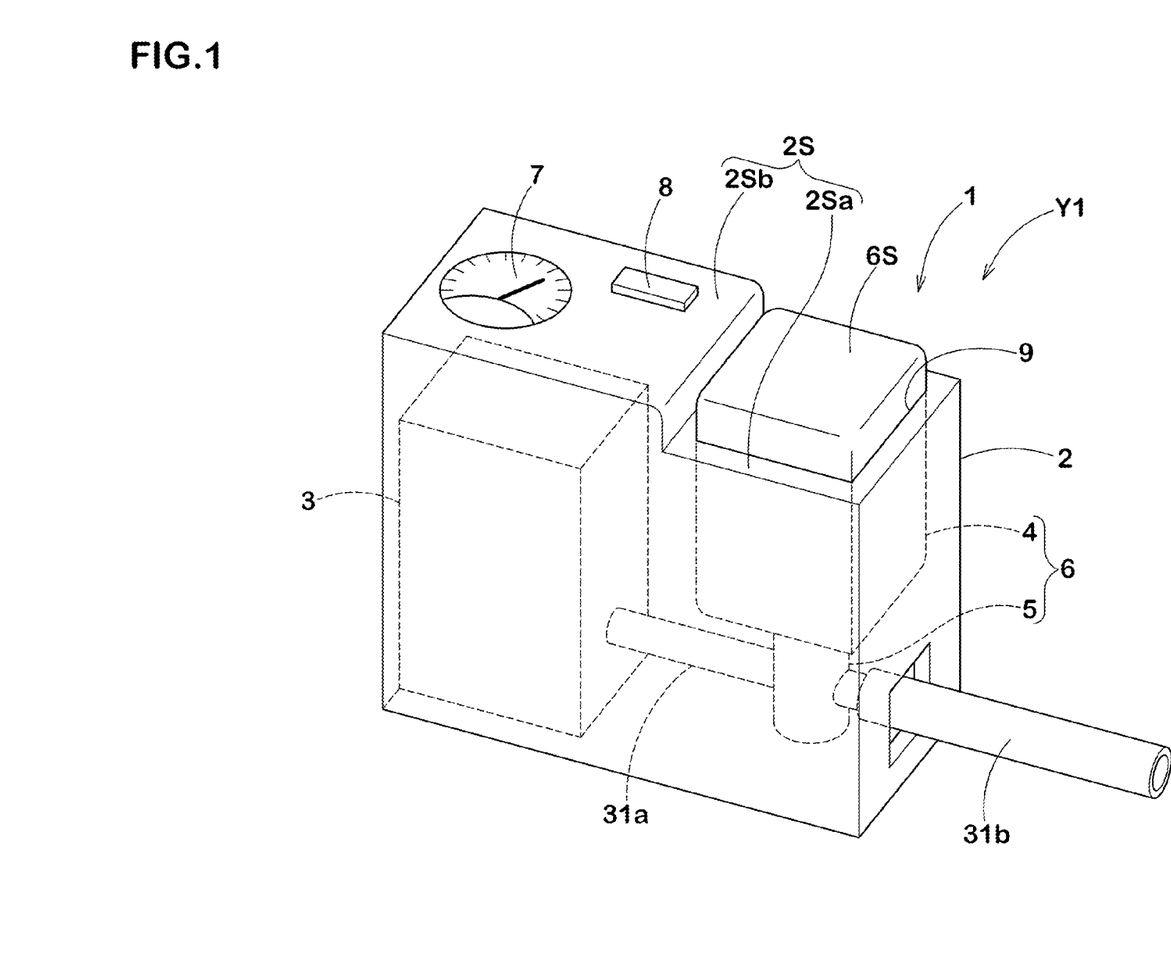
FIG. 1 is a perspective view showing an embodiment of an integrated puncture repair kit according to the present invention.

Referring to FIG. 1, an integrated puncture repair kit 1 according to the present embodiment includes a housing case 2, a compressor 3 to discharge compressed air, and a bottle unit 6. The compressor 3 and the bottle unit 6 are housed and held in a lateral array in the housing case 2. The bottle unit 6 includes a bottle container 4 storing a puncture repair fluid T, and an extraction cap 5 to be attached to a mouth portion 4A of the bottle container 4.

No special restriction is imposed on the compressor 3, and ones having a well-known structure to be operated by a car battery are suitably employed.

The housing case 2 has a rectangular box shape. In the present embodiment, an upper surface portion 2Sa of an upper surface 2S of the housing case 2 on the side on which the bottle unit 6 is housed is defined by a stepped surface lower than an upper surface portion 2Sb on the side on which the compressor 3 is housed. A pressure gauge 7 and a power switch 8 are disposed on the upper surface portion 2Sb on the high side. An opening portion 9 that permits exposure of an upper end portion of the bottle unit 6 is disposed on the upper surface portion 2Sa on the low side. The bottle unit 6 is to be held by holding means 32 (shown in FIG. 2) so that an upper surface 6S of the bottle unit 6 is approximately flush with the upper surface portion 2Sb in a normal state Y1 defined as a state before operation of a switching means 14.

Figure 2:
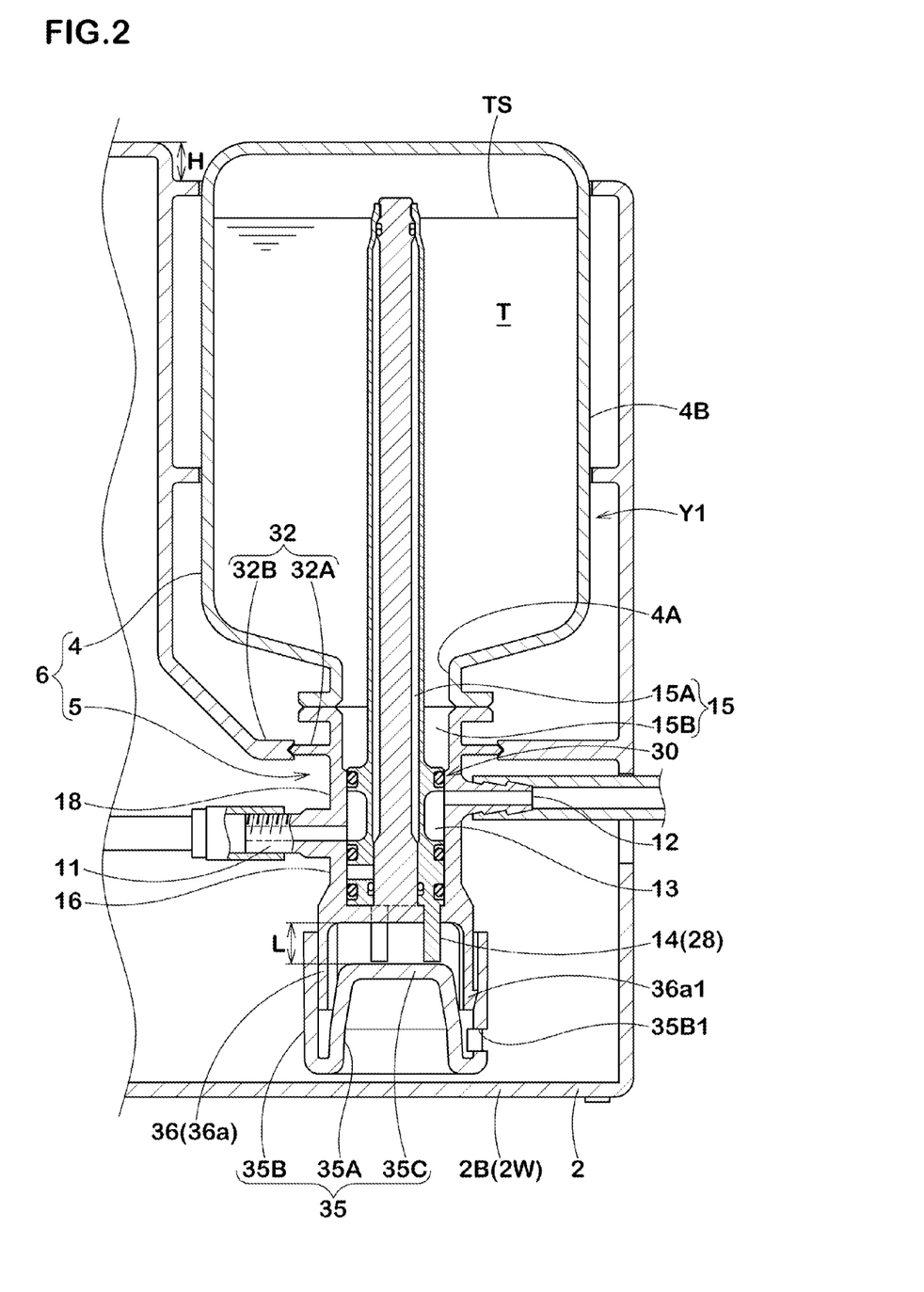
FIG. 2 is a cross-sectional view showing in enlarged dimension a bottle unit in normal state.

As shown in FIG. 2, the bottle unit 6 is made up of the bottle container 4 and the extraction cap 5. The bottle container 4 includes a bottomed container portion 4B to store the puncture repair fluid T, and a small-diameter cylindrical shaped mouth portion 4A that projects from a lower end of the bottomed container portion 4B.

The extraction cap 5 includes an inlet mouth portion 11, an outlet mouth portion 12, a flow passage dedicated to air 13, a flow passage dedicated to puncture repair 15, a first on-off valve 30, and switching means 14.

The inlet mouth portion 11 is to discharge the compressed air from the compressor 3 to the extraction cap 5.

The outlet mouth portion 12 is to take out only the taken compressed air or both of the compressed air and the puncture repair fluid T to the outside of the extraction cap 5.

The flow passage dedicated to air 13 is coupled to the inlet mouth portion 11 in the normal state Y1. The flow passage dedicated to air 13 is to allow the inlet mouth portion 11 to communicate with the outlet mouth portion 12 without passing through the interior of the bottle container 4.

The flow passage dedicated to puncture repair 15 is to be coupled to the inlet mouth portion 11 instead of the flow passage dedicated to air 13 by the switching means 14. The flow passage dedicated to puncture repair 15 is made up of a first flow passage portion 15A that allows the inlet mouth portion 11 to communicate with the interior of the bottle container 4, and a second flow passage portion 15B that allows the interior of the bottle container 4 to communicate with the outlet mouth portion 12.

The first on-off valve 30 is disposed in the second flow passage portion 15B. The first on-off valve 30 is to close the second flow passage portion 15B so as to prevent leakage of the puncture repair fluid T in the normal state Y1.

Figure 4:
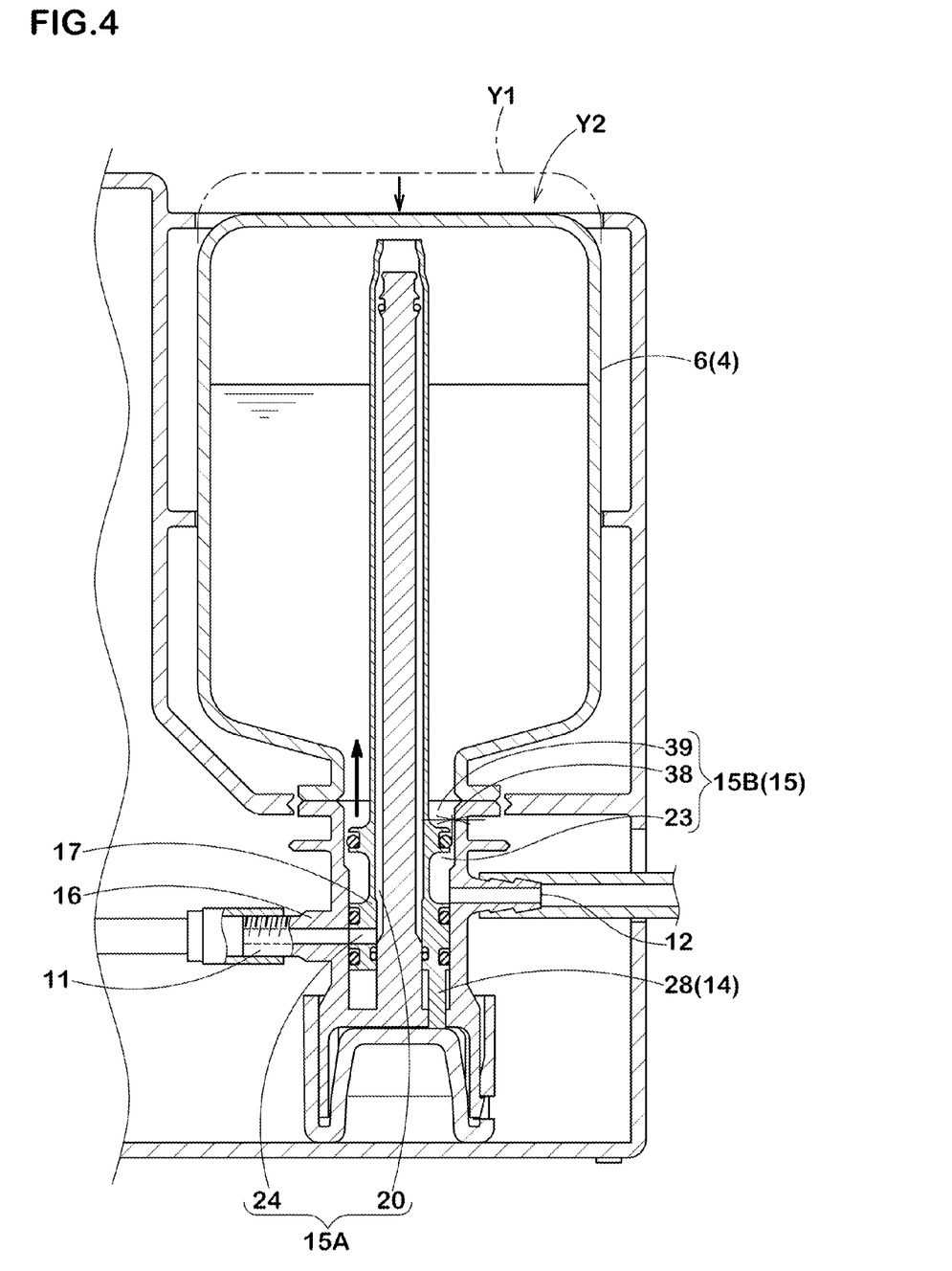
FIG. 4 is a cross-sectional view showing in enlarged dimension the bottle unit at the time of switching.

The switching means 14 is to be operated by a push-down of the bottle unit 6 so as to switch the normal state Y1 to a switched state Y2 as shown in FIG. 4. Consequently, a coupling destination of the inlet mouth portion 11 is switched from the flow passage dedicated to air 13 to the flow passage dedicated to puncture repair 15. The switching means 14 is also to release the first on-off valve 30 so as to open the second flow passage portion 15B.

Figure 3:
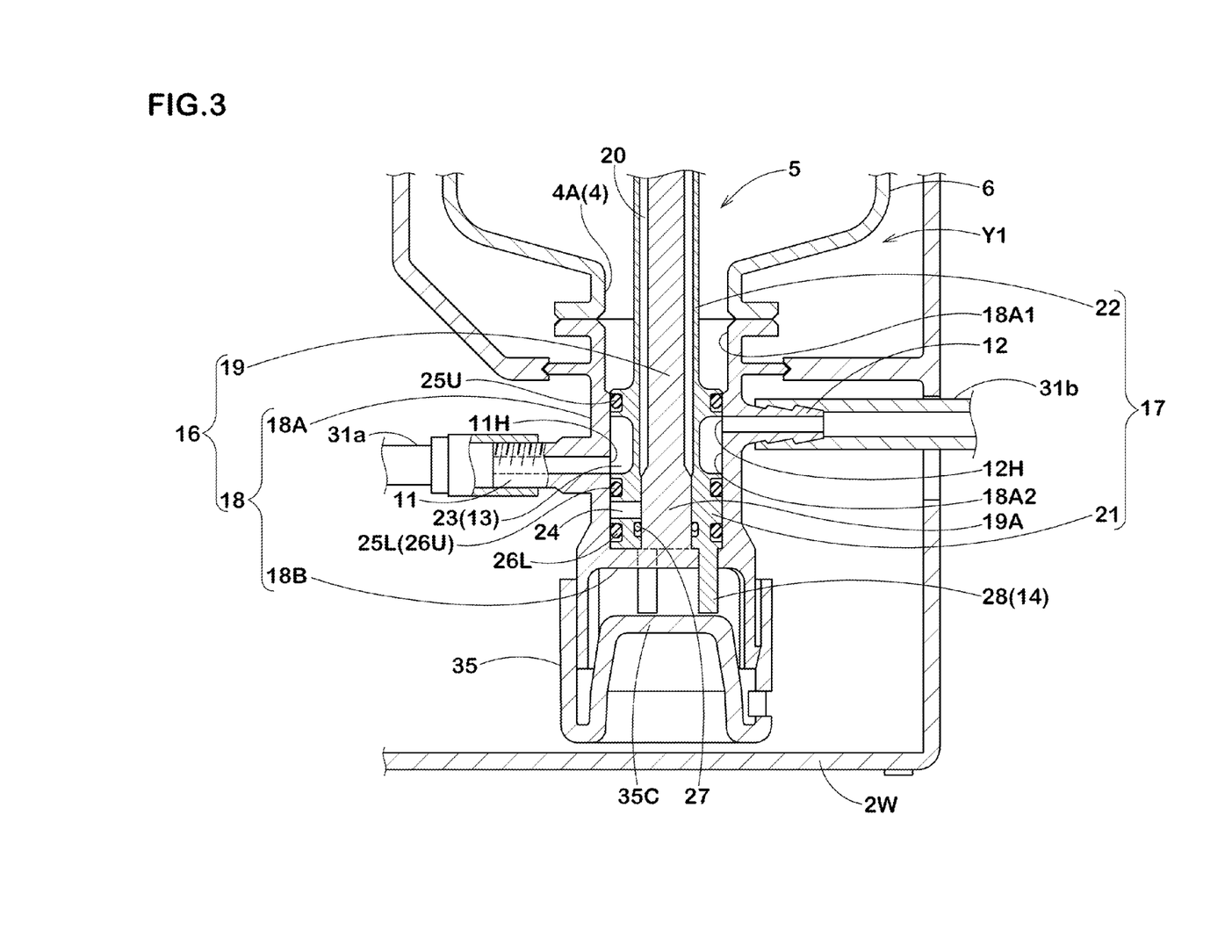
FIG. 3 is a cross-sectional view showing in further enlarged dimension an extraction cap in normal state.

To be specific, the extraction cap 5 according to the present embodiment includes a cap body 16 and a mobile body 17 as shown in enlarged dimension in FIG. 3. The cap body 16 integrally includes a barrel portion 18 and a support portion 19. The barrel portion 18 includes a tubular portion 18A, whose upper end is attached to the mouth portion 4A of the bottle container 4, and a bottom portion 18B to close a lower end of the tubular portion 18A. The support portion 19 extends upward from the bottom portion 18B and coaxially with the tubular portion 18A. A switching retainer 35 to retain the switched state Y2 is attached to a lower end portion of the cap body 16.

The present embodiment illustrates the case where the upper end of the tubular portion 18A and the mouth portion 4A of the bottle container 4 are secured to each other by welding. Alternatively, both may be secured to each other by using, for example, adhesive. Still alternatively, both may be secured to each other by various methods, such as screwing.

An inner wall surface of the tubular portion 18A includes a large diameter wall portion 18A1 having a large inner diameter, and a small diameter wall portion 18A2 having a small inner diameter that is continuous with a lower side of the large diameter wall portion 18A1 with a step portion interposed therebetween. A center hole of the inlet mouth portion 11 and a center hole of the outlet mouth portion 12 are to communicate with the small diameter wall portion 18A2. An opening 11H of the inlet mouth portion 11 is located lower than an opening 12H of the outlet mouth portion 12.

A large diameter positioning portion 19A to coaxially position the mobile body 17 is disposed at a lower end portion of the support portion 19. A first clearance portion 20 extending upward between the support portion 19 and the mobile body 17 is defined above the positioning portion 19A. An upper end of the positioning portion 19A is terminated without extending upward beyond the opening 11H of the inlet mouth portion 11. The upper end of the support portion 19 is also terminated in the bottle container 4.

The inlet mouth portion 11 and the compressor 3 need to permit easy attachment and detachment so that a user can replace the bottle unit 6. Therefore in the present embodiment, the inlet mouth portion 11 is formed as a nipple fitting screwable to a tip portion of a hose 31a extending from the compressor 3. Hence, it is unnecessary for the user to remove a hose 31b for coupling a tire from the outlet mouth portion 12. Accordingly, the outlet mouth portion 12 is formed as a barb fitting in the present embodiment.

The mobile body 17 is externally inserted in and held by the support portion 19 so as to be vertically movable relative to the support portion 19. In the present embodiment, the mobile body 17 is made up of a piston portion 21 to be brought into airtight contact with the small diameter wall portion 18A2, and a small diameter sheath pipe portion 22 extending upward from the piston portion 21 and coaxially therewith.

The sheath pipe portion 22 has approximately the same height as the support portion 19. In the present embodiment, an upper end of the sheath pipe portion 22 and an upper end of the support portion 19 are located above a fluid surface TS of the puncture repair fluid T so as to prevent backflow of the puncture repair fluid T into the first clearance portion 20.

The piston portion 21 includes a circumferential groove-shaped recessed portion 23 defined on an outer peripheral surface of the piston portion 21, and a through hole portion 24 disposed below the recessed portion 23. The through hole portion 24 is to permit communication between an outer peripheral surface side and an inner peripheral surface side of the piston portion 21. First upper and lower seal rings 25U and 25L to be airtightly contactable with the small diameter wall portion 18A2 are respectively disposed above and below the recessed portion 23 on the outer peripheral surface of the piston portion 21. Second upper and lower seal rings 26U and 26L to be airtightly contactable with the small diameter wall portion 18A2 are respectively disposed above and below the through hole portion 24 on the outer peripheral surface of the piston portion 21. In the present embodiment, the first lower seal ring 25L is also used as the second upper seal ring 26U. Further in the present embodiment, a third seal ring 27 airtightly contactable with the positioning portion 19A is disposed below the through hole portion 24 on the inner peripheral surface of the piston portion 21.

The puncture repair kit 1 according to the present embodiment includes holding means 32 for holding the bottle unit 6 in a floating state from an inner wall portion 2W of the housing case 2 located below the bottle unit 6 in the normal state Y1 as shown in FIG. 2. The inner wall portion 2W is defined as a bottom plate 2B of the housing case 2.

In the present embodiment, the holding means 32 is made up of an overhanging portion 32A that overhangs in a flange shape from the outer periphery of the barrel portion 18, and a locking piece 32B disposed close to the housing case 2 so as to lock an outer peripheral end of the overhanging portion 32A. Upon the push-down of the bottle unit 6, the lock is released to permit lowering of the bottle unit 6. Consequently, the switching retainer 35 attached to the lower end portion of the cap body 16 is brought into contact with the upper surface of the inner wall portion 2W so as to push up the mobile body 17.

An attachment portion 36 to attach the switching retainer 35 is disposed at the lower end portion of the cap body 16. The attachment portion 36 according to the present embodiment is made up of a plurality of elastically deformable locking pieces 36a projecting downward from the lower surface of the cap body 16 along the outer periphery thereof. A hook claw 36a1 projects outward from a lower end of at least one of the locking pieces 36a.

In the present embodiment, the switching retainer 35 integrally includes an inner tube portion 35A, an outer tube portion 35B that is folded back in a u-shape at the lower end of the inner tube portion 35A and extends upward coaxially therewith, and an upper plate portion 35C to close an upper end of the inner tube portion 35A. The switching retainer 35 is to hold the locking piece 36a between the inner tube portion 35A and the outer tube portion 35B in the normal state Y1. Consequently, the switching retainer 35 is secured to the cap body 16 with a distance L between the upper plate portion 35C and the lower surface of the cap body 16. In the switched state Y2, the lower end of the switching retainer 35 is brought into contact with the upper surface of the inner wall portion 2W so as to allow the switching retainer 35 to be pushed up. Then, a relative lifting between the upper plate portion 35C and the lower surface of the cap body 16 occurs up to a position at which both are close to each other or contacted with each other. The outer tube portion 35B includes a locking hole 35B1 that is to be locked to the hook claw 36a1 so as to maintain a lifted position.

As shown in FIG. 3, a projected piece 28 that projectedly extends downward through the bottom portion 18B is disposed at a lower end of the piston portion 21. In the present embodiment, the projected piece 28 is not contacted with the upper plate portion 35C in the normal state Y1. Accordingly, the mobile body 17 is held at a lower limit position at which the lower surface of the piston portion 21 is contacted with the upper surface of the bottom portion 18B. At this time, the opening 11H of the inlet mouth portion 11 communicates with the recessed portion 23, and the recessed portion 23 communicates with the opening 12H of the outlet mouth portion 12. Thus in the present embodiment, the recessed portion 23 defines the flow passage dedicated to air 13 that does not pass through the interior of the bottle container 4.

Figure 5:
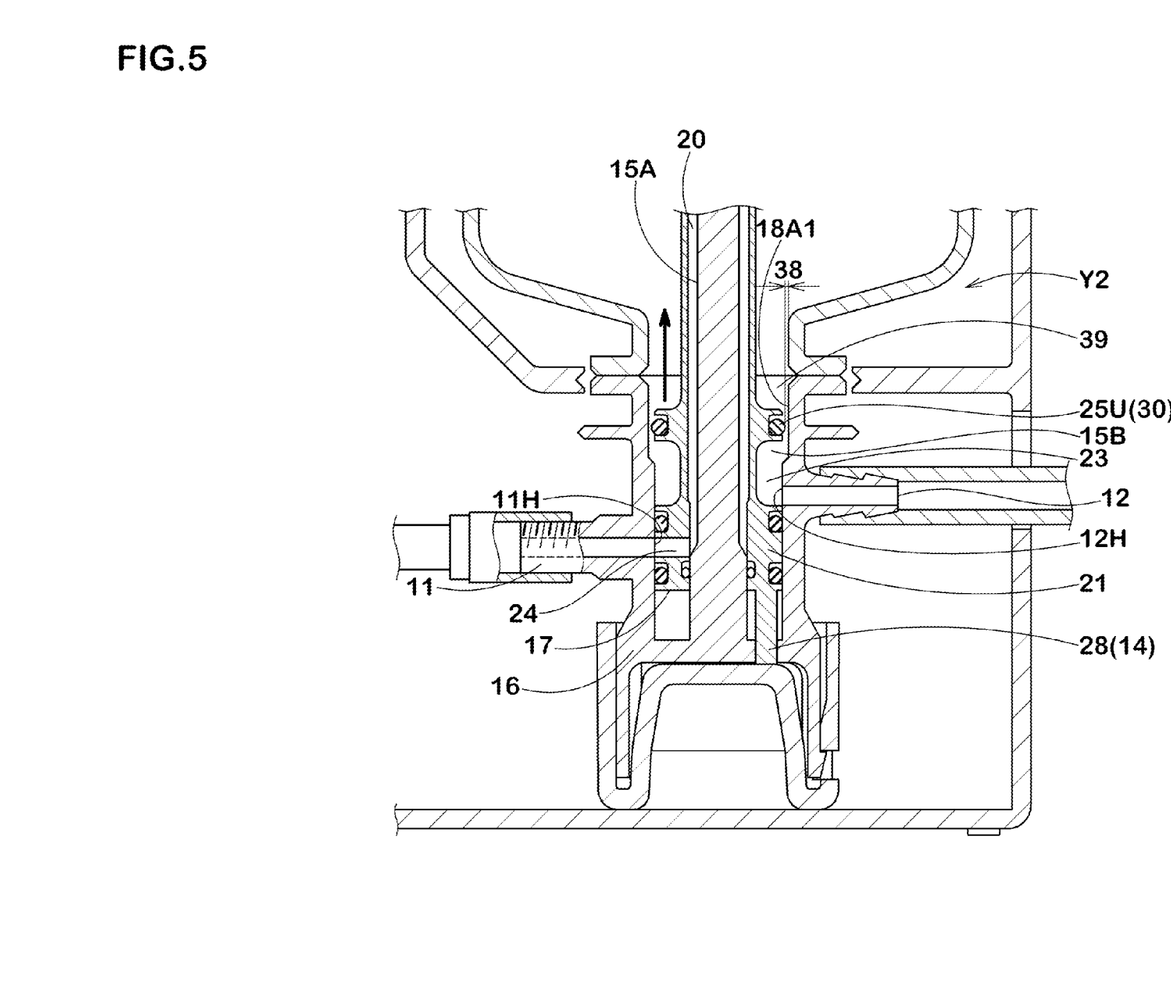
FIG. 5 is a cross-sectional view showing in further enlarged dimension the extraction cap at the time of switching.

The projected piece 28 is brought into contact with the upper plate portion 35C and is pushed up when the bottle unit 6 is pushed down. Consequently, as shown in FIGS. 4 and 5 illustrating a switched state Y2, the mobile body 17 is moved upward relative to the cap body 16. In the switched state Y2, the opening 11H of the inlet mouth portion 11 communicates with the through hole portion 24 as shown in enlarged dimension in FIG. 5. The through hole portion 24 communicates with the first clearance portion 20. According to the present embodiment, the through hole portion 24 and the first clearance portion 20 define the first flow passage portion 15A that allows the inlet mouth portion 11 to communicate with the interior of the bottle container 4.

In the switched state Y2, the first seal ring 25U is opposed to the large diameter wall portion 18A1. Consequently, a second clearance portion 38 is defined between the piston portion 21 and the large diameter wall portion 18A1. The second clearance portion 38 is to communicate with the opening 12H of the outlet mouth portion 12 with the recessed portion 23 interposed therebetween. According to the present embodiment, space 39 between the sheath pipe portion 22 and the large diameter wall portion 18A1, the second clearance portion 38, and the recessed portion 23 define the second flow passage portion 15B that allows the interior of the bottle container 4 to communicate with the outlet mouth portion 12.

In the normal state Y1, the first upper and lower seal rings 25U and 25L disposed in the piston portion 21 close the second clearance portion 38 so as to close the second flow passage portion 15B. In the switched state Y2, the first upper and lower seal rings 25U and 25L open the second clearance portion 38 so as to open the second flow passage portion 15B. Accordingly, the seal rings 25U and 25L define the first on-off valve 30.

In the present embodiment, the projected piece 28, the mobile body 17, and the switching retainer 35 constitute the switching means 14 for switching between the flow passage dedicated to air 13 and the flow passage dedicated to puncture repair 15 and for retaining the switched state upon the push-down of the bottle unit 6.

Figure 6:
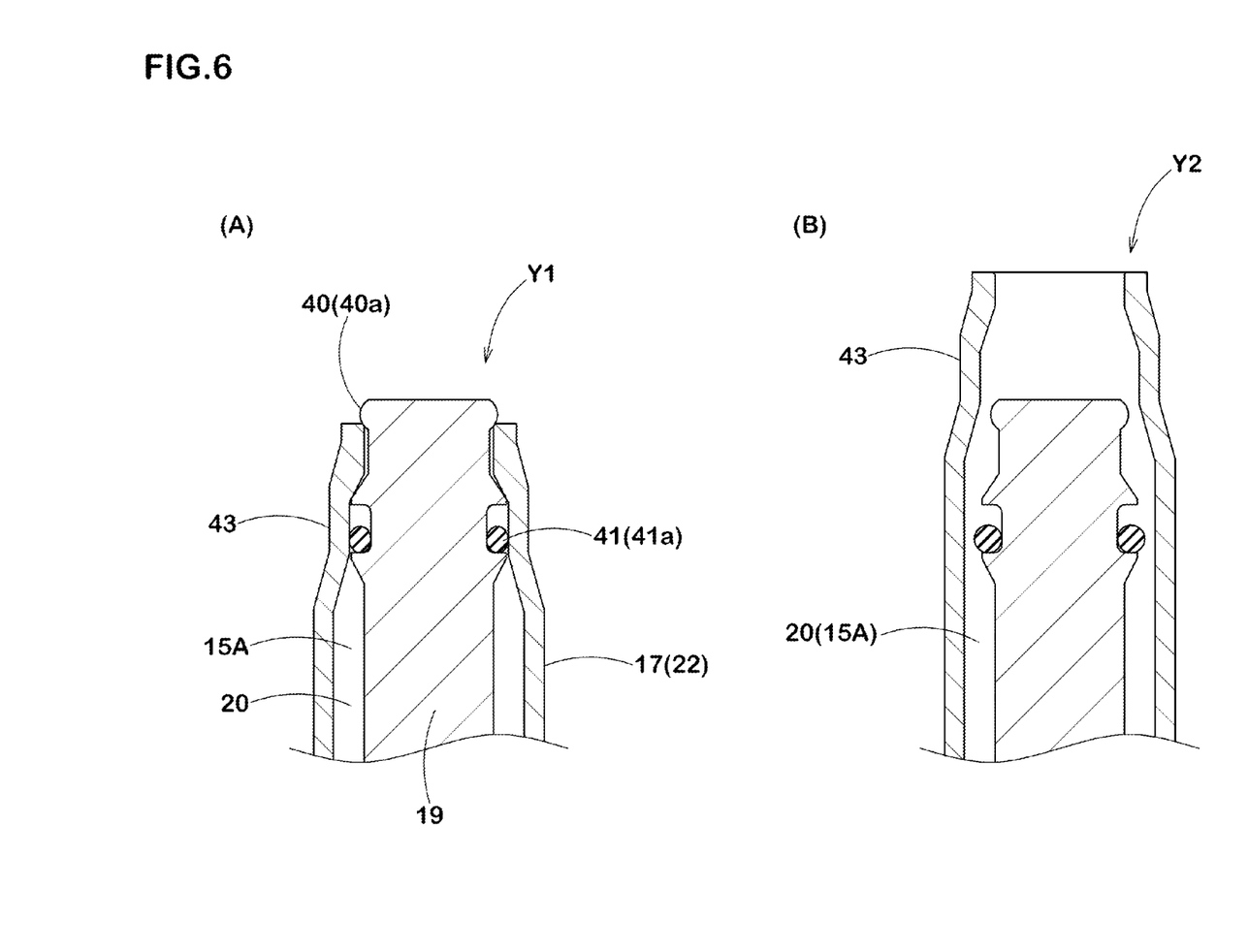
FIGS. 6(A) and 6(B) are respectively cross-sectional views in enlarged dimension showing a sheath pipe portion in normal state and a switched state.

As shown in FIGS. 6(A) and 6(B), a displacement prevention portion 40 is disposed on an upper end of the support portion 19 in the present embodiment. The displacement prevention portion 40 is to prevent upward displacement of the mobile body 17 in the normal state Y1. The prevention portion 40 includes a projection 40a of a semicircular arc shape in cross section that projects at a small height from the outer peripheral surface of the support portion 19. The upper end of the sheath pipe portion 22 is brought into contact with the projection 40a so as to prevent the upward displacement of the mobile body 17. The sheath pipe portion 22 is also movable upward beyond the projection 40a by a strong push-up force during the push-down.

A second on-off valve 41 to close the first flow passage portion 15A in the normal state Y1 is defined at an upper end portion of the support portion 19. The second on-off valve 41 includes a seal ring 41a disposed on the outer periphery of the support portion 19. An aperture portion 43 is disposed at an upper end portion of the sheath pipe portion 22. The aperture portion 43 is brought into contact with the seal ring 41a so as to close the first clearance portion 20. In the switched state Y2, the aperture portion 43 is moved upward and not contacted with the seal ring 41a so as to open the first clearance portion 20 (the first flow passage portion 15A).

Figure 7:
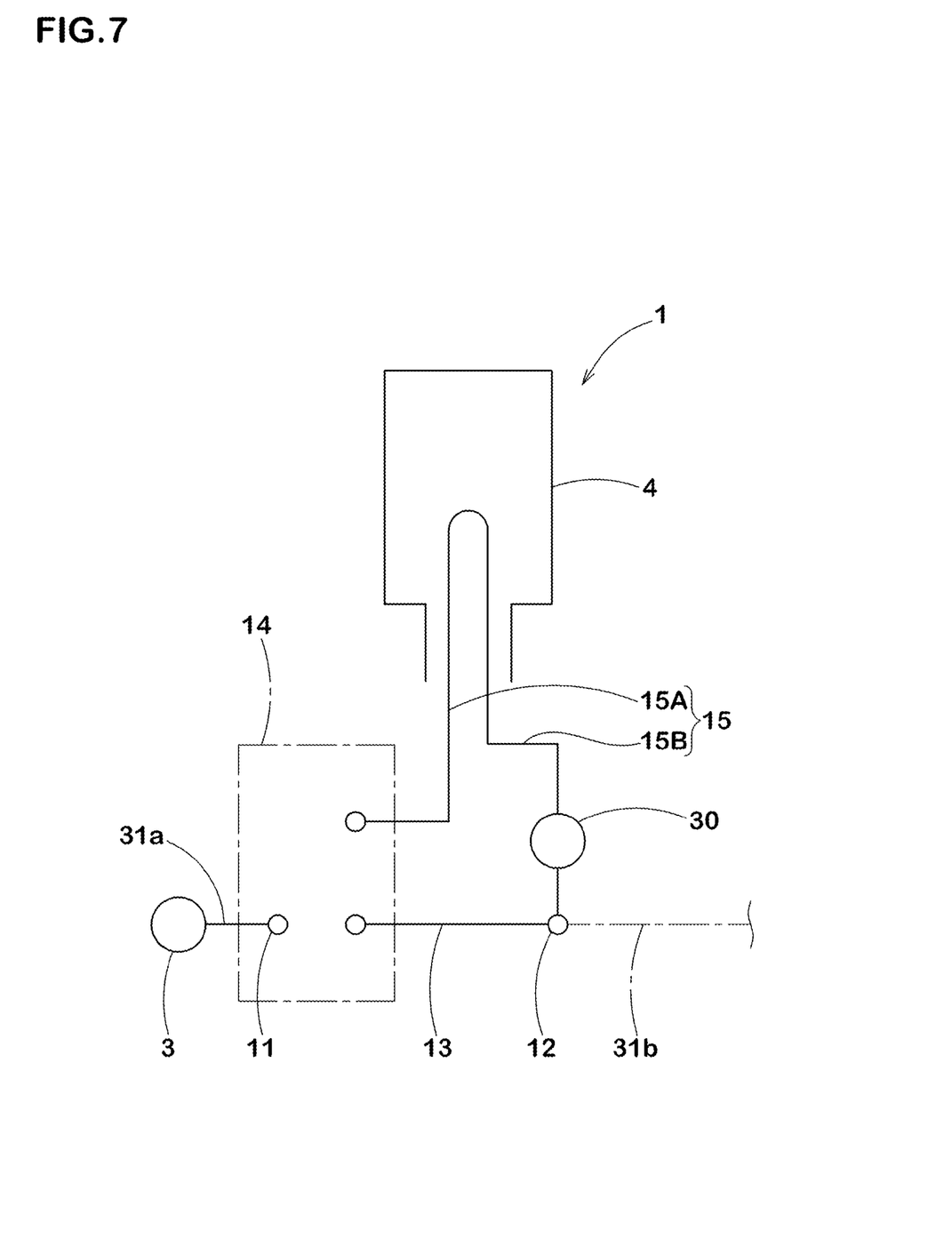
FIG. 7 is a conceptual view showing in a simplified manner a flow passage structure in the puncture repair kit of the present invention.

FIG. 7 is a conceptual view showing in a simplified manner a flow passage structure in the puncture repair kit 1 of the present invention.

Although the particularly preferred embodiment of the present invention has been described in detail, the present invention can be modified and carried out in various embodiments without being limited to the illustrated embodiment.

DESCRIPTION OF THE REFERENCE NUMERAL

1 Integrated puncture repair kit
2 Housing case
2W Inner wall portion
3 Compressor
4 Bottle container
4A Mouth portion
5 Extraction cap
6 Bottle unit
11 Inlet mouth portion
12 outlet mouth portion
13 Flow passage dedicated to air
14 switching means
15 Flow passage dedicated to puncture repair
15A First flow passage portion
15B Second flow passage portion
16 Cap body
17 Mobile body
18 Barrel portion
18A Tubular portion
18A1 Large diameter wall portion
18A2 Small diameter wall portion
18B Bottom portion
19 Support portion
20 First clearance portion
21 Piston portion
22 sheath pipe portion
23 Recessed portion
24 Through hole portion
25U, 25L upper and lower seal rings
28 Projected piece
30 First on-off valve
35 switching retainer
38 Second clearance portion
41 second on-off valve
T Puncture repair fluid

What is claimed is:

1. An integrated puncture repair kit comprising:
a compressor disposed in a housing case and configured to discharge compressed air; and
a bottle unit disposed in the housing case and comprising an extraction cap attached to a mouth portion of a bottle container storing a puncture repair fluid,
wherein the extraction cap comprises an inlet mouth portion, an outlet mouth portion, a flow passage dedicated to air, a flow passage dedicated to puncture repair, a first on-off valve, and switching means,
wherein the inlet mouth portion is configured to take the compressed air from the compressor into the extraction cap,
wherein the outlet mouth portion is configured to discharge the taken compressed air or both the compressed air and the puncture repair fluid to outside the extraction cap,
wherein the flow passage dedicated to air is configured to be coupled to the inlet mouth portion in a normal state, defined as a state before operation of the switching means, so as to allow the inlet mouth portion to communicate with the outlet mouth portion without passing through an interior of the bottle container,
wherein the flow passage dedicated to puncture repair comprises a first flow passage portion and a second flow passage portion, the first flow passage portion is configured to be coupled to the inlet mouth portion instead of the flow passage dedicated to air by the switching means so as to allow the inlet mouth portion to communicate with the interior of the bottle container, and the second flow passage portion is configured to allow the interior of the bottle container to communicate with the outlet mouth portion,
wherein the first on-off valve is interposed in the second flow passage portion and is configured to close the second flow passage portion in the normal state,
wherein the switching means is configured to be operated upon a push-down of the bottle unit so as to switch a coupling destination of the inlet mouth portion from the flow passage dedicated to air to the flow passage dedicated to puncture repair, and the switching means is configured to release the first on-off valve so as to open the second flow passage portion,
wherein the extraction cap comprises a cap body and a mobile body,
wherein the cap body integrally comprises a barrel portion and a support portion, the barrel portion comprises a tubular portion whose upper end is attached to the mouth portion of the bottle container, and a bottom portion configured to close a lower end of the tubular portion, and the support portion extends upward from the bottom portion and coaxially with the tubular portion so as to reach the interior of the bottle container,
wherein the mobile body is externally inserted in and held by the support portion so as to be vertically movable relative to the support portion,
wherein the first on-off valve is disposed in the mobile body so as to be integrally movable with the mobile body, and
wherein a relative upward movement of the mobile body causes a coupling destination switching from the flow passage dedicated to air to the flow passage dedicated to puncture repair, and causes release of the first on-off valve.

2. The integrated puncture repair kit according to claim 1, wherein the switching means comprises a switching retainer to retain a state of being switched to the flow passage dedicated to puncture repair.

3. The integrated puncture repair kit according to claim 1,
wherein an inner wall surface of the tubular portion comprises a large diameter wall portion having a large inner diameter, and a small diameter wall portion having a small inner diameter, and the small diameter wall portion is continuous with a lower side of the large diameter wall portion with a step portion interposed therebetween,
wherein the mobile body comprises a piston portion configured to be airtightly contacted with the small diameter wall portion, and a sheath pipe portion extending from the piston portion and coaxially with the piston portion,
wherein the piston portion comprises a circumferential groove shaped recessed portion to be defined on an outer peripheral surface of the piston portion, and a through hole portion disposed below the recessed portion and configured to permit communication between an outer peripheral surface side and an inner peripheral surface side of the piston portion,
wherein the flow passage dedicated to air is defined by the recessed portion,
wherein the first flow passage portion of the flow passage dedicated to puncture repair comprises the through hole portion, and a first clearance portion between the sheath pipe portion and the support portion, and
wherein the second flow passage portion of the flow passage dedicated to puncture repair comprises the recessed portion, and a second clearance portion between the piston portion and the large diameter wall portion.

4. The integrated puncture repair kit according to claim 1, wherein the switching means comprises a projected piece projectedly extending downward from a lower end of the mobile body and passing through the bottom portion, and the mobile body is configured to cause a relative upward movement with respect to the cap body by the projected piece to be pushed up as the bottle unit is pushed down.

5. The integrated puncture repair kit according to claim 3,
wherein the first on-off valve comprises an upper seal ring and a lower seal ring disposed on an outer peripheral surface of the piston portion and respectively located above and below the recessed portion, and
wherein in the normal state, the upper seal ring and the lower seal ring are brought into close contact with the small diameter wall portion so as to close the second flow passage portion, and the relative upward movement of the mobile body allows the upper seal ring to oppose to the large diameter wall portion so as to open the second flow passage portion.

6. The integrated puncture repair kit according to claim 3, wherein an upper end of the support portion and an upper end of the sheath pipe portion are located above a fluid surface of the puncture repair fluid.

7. The integrated puncture repair kit according to claim 3, wherein a second on-off valve configured to close the first flow passage portion in the normal state is disposed at an upper end portion of the support portion, and the second on-off valve is configured to open the first flow passage portion upon the relative upward movement of the mobile body.

8. The integrated puncture repair kit according to claim 3, wherein the switching means comprises a projected piece projectedly extending downward from a lower end of the mobile body and passing through the bottom portion, and the mobile body is configured to cause a relative upward movement with respect to the cap body by the projected piece to be pushed up as the bottle unit is pushed down.

9. The integrated puncture repair kit according to claim 4, wherein the first on-off valve comprises an upper seal ring and a lower seal ring disposed on an outer peripheral surface of the piston portion and respectively located above and below the recessed portion, and wherein in the normal state, the upper seal ring and the lower seal ring are brought into close contact with the small diameter wall portion so as to close the second flow passage portion, and the relative upward movement of the mobile body allows the upper seal ring to oppose to the large diameter wall portion so as to open the second flow passage portion.

10. The integrated puncture repair kit according to claim 4, wherein an upper end of the support portion and an upper end of the sheath pipe portion are located above a fluid surface of the puncture repair fluid.

11. The integrated puncture repair kit according to claim 5, wherein an upper end of the support portion and an upper end of the sheath pipe portion are located above a fluid surface of the puncture repair fluid.

12. The integrated puncture repair kit according to claim 4, wherein a second on-off valve configured to close the first flow passage portion in the normal state is disposed at an upper end portion of the support portion, and the second on-off valve is configured to open the first flow passage portion upon the relative upward movement of the mobile body.

13. The integrated puncture repair kit according to claim 5, wherein a second on-off valve configured to close the first flow passage portion in the normal state is disposed at an upper end portion of the support portion, and the second on-off valve is configured to open the first flow passage portion upon the relative upward movement of the mobile body.

14. The integrated puncture repair kit according to claim 6, wherein a second on-off valve configured to close the first flow passage portion in the normal state is disposed at an upper end portion of the support portion, and the second on-off valve is configured to open the first flow passage portion upon the relative upward movement of the mobile body.

* * * * *